United States Patent
Xu et al.

(10) Patent No.: US 12,511,050 B2
(45) Date of Patent: Dec. 30, 2025

(54) DATA STORAGE METHOD AND SYSTEM, AND PROCESSOR

(71) Applicant: HUAWEI TECHNOLOGIES CO., LTD., Guangdong (CN)

(72) Inventors: Wei Xu, Hangzhou (CN); Jie Su, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 35 days.

(21) Appl. No.: 18/070,733

(22) Filed: Nov. 29, 2022

(65) Prior Publication Data

US 2023/0093218 A1    Mar. 23, 2023

Related U.S. Application Data

(63) Continuation of application No. PCT/CN2020/093615, filed on May 30, 2020.

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88;
(Continued)

(56) References Cited

U.S. PATENT DOCUMENTS 8,578,084 B2 * 11/2013 Borchers ............... G06F 3/0613
                                                                    710/305
10,854,290 B1 * 12/2020 Wu ...................... G11C 11/5628
(Continued)

FOREIGN PATENT DOCUMENTS

CN    110941398 A    3/2020
CN    111026674 A    4/2020

OTHER PUBLICATIONS

PA-SSD: A Page-Type Aware TLC SSD for Improved Write/Read Performance and Storage Efficiency; Zhang et al.; Proceedings of the 2018 International Conference on Supercomputing; Jun. 2018; ACM, New York, NY, USA, 22-32. https://doi.org/10.1145/3205289.3205319 (Year: 2018).*
(Continued)

*Primary Examiner* — Daniel C. Chappell
(74) *Attorney, Agent, or Firm* — Fish & Richardson P.C.

(57) ABSTRACT

In an implementation, a data storage method comprises obtaining a write request by a processing apparatus, where the write request includes first data to be written. Determining based on at least one of an access feature and a service requirement of the first data, a first category of the first data at a current moment; and indicating the storage apparatus to store the first data in a first type of storage unit. The first category indicates a programming rate requirement of the first data, and the first type is determined based on the first category.

18 Claims, 7 Drawing Sheets

(58) Field of Classification Search
CPC .. G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | |
|---|---|---|---|
| 2004/0080985 A1* | 4/2004 | Chang | G06F 12/0246 |
| | | | 711/E12.008 |
| 2014/0281158 A1* | 9/2014 | Ravimohan | G06F 12/0246 |
| | | | 711/103 |
| 2014/0310456 A1* | 10/2014 | Chambliss | G06F 3/0614 |
| | | | 711/114 |
| 2015/0193147 A1 | 7/2015 | Iyigun et al. | |
| 2019/0102083 A1* | 4/2019 | Dusija | G06F 3/0679 |

OTHER PUBLICATIONS

M. Murugan and D. H. C. Du, "Hybrot: Towards Improved Performance in Hybrid SLC-MLC Devices," 2012 IEEE 20th International Symposium on Modeling, Analysis and Simulation of Computer and Telecommunication Systems, Washington, DC, USA, 2012, pp. 481-484, doi: 10.1109/MASCOTS.2012.60. (Year: 2012).*

Anatomy of the Linux kernel; M. Jones; Jun. 6, 2007; retrieved from https://developer.ibm.com/articles/l-linux-kernel/ (Year: 2007).*

J.-Y. Paik, E.-S. Cho and T.-S. Chung, "Reorganizing Data Blocks in Flash Memory by Program Translation," 2010 10th IEEE International Conference on Computer and Information Technology, Bradford, UK, 2010, pp. 1948-1953, doi: 10.1109/CIT.2010.331. (Year: 2010).*

Extended European Search Report in European Appln No. 20938593.9, dated Jun. 12, 2023, 10 pages.

International Search Report and Written Opinion in International Appln. No. PCT/CN2020/093615, mailed on Feb. 24, 2021, 14 pages (with English translation).

* cited by examiner

DATA STORAGE METHOD AND SYSTEM, AND PROCESSOR

CROSS-REFERENCE TO RELATED APPLICATIONS

This application is a continuation of International Application No. PCT/CN2020/093615, filed on May 30, 2020, the disclosure of which is hereby incorporated by reference in its entirety.

TECHNICAL FIELD

This disclosure relates to the field of storage technologies, and in particular, to a data storage method and system, and a processor.

BACKGROUND

Universal flash storage (UFS) is a new storage device. The UFS includes a storage controller and a storage array. An area in the storage array is used as a single level cell (SLC) storage area, and another area in the storage array is used as a triple level cell (TLC) storage area. During actual disclosure, the storage controller receives a write request from an disclosure (disclosureAPP). The write request includes data to be written into the storage array. The storage controller writes the data into the SLC storage area to improve a write rate of the UFS. When no write request is received, the storage controller migrates data stored in the SLC storage area to the TLC storage area. This enables the SLC storage area to cache data in a next write request received by the storage controller, avoids exhausting storage space of the SLC storage area, and ensures stability of the write rate of the UFS.

However, when the storage controller continuously receives write requests and writes data in the write requests into the SLC storage area, the SLC storage area may store excessive data, and the storage space is quickly exhausted. The storage controller writes data in a subsequently received write request into the TLC storage area. In this case, the write rate of the UFS decreases and performance deteriorates.

SUMMARY

Embodiments of this disclosure provide a data storage method and system, and a processor. This can improve a data write rate and performance of a storage apparatus.

To achieve the foregoing objectives, the following technical solutions are used in embodiments of this disclosure.

According to a first aspect, an embodiment of this disclosure provides a data storage method. The method may be performed by a processing apparatus of a data storage system, or may be performed by a chip used in the processing apparatus of the data storage system. The data storage system further includes a storage apparatus. The storage apparatus includes at least two types of storage units. Different types of storage units have different data programming rates. The following describes an example in which the method is performed by the processing apparatus. The method includes: The processing apparatus obtains a write request, and determines, based on at least one of an access feature and a service requirement of first data, a first category of the first data at a current moment. The write request includes the first data to be written, and the first category indicates a programming rate requirement of the first data. The processing apparatus indicates the storage apparatus to store the first data in a first type of storage unit. The first type is determined based on the first category.

According to the data storage method provided in this embodiment of this disclosure, after obtaining the write request, the processing apparatus determines a category of the first data at the current moment, namely the first category, where the first data is in the write request. Different categories may indicate different programming rate requirements of the first data. Then, the processing apparatus indicates the storage apparatus to store the first data in the first type of storage unit. The first type is determined based on the first category of the first data at the current moment. In other words, a programming rate of the first type of storage unit matches the programming rate requirement of the first data, to implement classified data storage. Not the first data in all write requests is stored in an SLC storage area. Instead, the first data in write requests is stored in different types of storage units based on categories. This effectively alleviates quick exhaustion of the SLC storage area, reduces a possibility of write rate reduction of the storage apparatus, and improves performance of the storage apparatus.

In a possible design, the storage apparatus further includes a storage controller. That the processing apparatus indicates the storage apparatus to store the first data in the first type of storage unit includes: The processing apparatus sends first indication information to the storage controller. The first indication information indicates the storage controller to store the first data in the first type of storage unit. In other words, the processing apparatus indicates, by sending the first indication information, the storage controller to store the first data.

In a possible design, the programming rate of the first type of storage unit meets the programming rate requirement indicated by the first category. In other words, the programming rate of the first type of storage unit matches the programming rate requirement of the first data. This can ensure a write rate for the first data.

In a possible design, the access feature includes at least one of an access frequency and an access category. The access category is classified based on the access frequency. The access category includes a cold data category and a hot data category.

In a possible design, the access feature includes the access frequency. A higher access frequency indicates a higher programming rate requirement of the first data indicated by the first category, to reduce a data write time and improve system performance.

In a possible design, the at least two types of storage units include an SLC storage unit and a TLC storage unit. The access feature includes the access category. If the access category is the hot data category, the first type of storage unit is the SLC storage unit. If the access category is the cold data category, the first type of storage unit is the TLC storage unit.

Hot data usually has a higher access frequency. First data of the hot data category is stored in the SLC storage unit. This can effectively reduce a time for writing the data into a storage array, and improve running efficiency and user experience of an disclosure. Hot data has a lower access frequency. First data of the cold data category is stored in the TLC storage unit. This can effectively alleviate quick exhaustion of the SLC storage area, and improve performance of the storage apparatus.

In a possible design, the service requirement includes at least one of a latency requirement and a latency category.

In a possible design, the service requirement includes the latency requirement. A higher latency requirement indicates a higher programming rate requirement of the first data indicated by the first category, to reduce system freezing and improve system performance.

In a possible design, the at least two types of storage units include the SLC storage unit and the TLC storage unit. The service requirement includes the latency category. If the latency category is a latency-sensitive category, the first type of storage unit is the SLC storage unit. If the latency category is a latency-insensitive category, the first type of storage unit is the TLC storage unit. The term "latency-sensitive" may indicate a requirement for a latency lower than a latency threshold, and the term "latency-insensitive" may indicate a requirement for a latency higher than or equal to the latency threshold.

In this case, latency-sensitive first data is stored in the SLC storage unit. This can reduce a time for writing the first data into the storage array, meet an actual requirement of an disclosure, and improve user experience. Latency-insensitive first data is stored in the TLC storage unit. This can effectively alleviate quick exhaustion of the SLC storage area, and improve performance of the storage apparatus.

In a possible design, the at least two types of storage units include the SLC storage unit and the TLC storage unit. The service requirement includes the latency category. If the latency category is a foreground thread latency category, the first type of storage unit is the SLC storage unit. If the latency category is a background thread latency category, the first type of storage unit is the TLC storage unit.

A foreground disclosure usually has a higher latency requirement. First data in a write request sent by the foreground disclosure is stored in the SLC storage unit. This can reduce "freezing", and improve user experience. A background disclosure usually has a lower latency requirement. First data in a write request sent by the background disclosure is stored in the TLC storage unit. This can effectively alleviate quick exhaustion of the SLC storage area, and improve performance of the storage apparatus.

In a possible design, the data storage method in this embodiment of this disclosure further includes: The processing apparatus determines, based on at least one of the access feature and the service requirement of the first data, a second category of the first data at a first moment, and indicates the storage apparatus to store the first data in a second type of storage unit. The second category indicates a programming rate requirement of the first data, the first moment is later than the current moment, and the second type is determined based on the second category.

In this case, after the storage controller has written first data in a write request into a storage unit, the processing apparatus can further update a type of the storage unit of the first data based on a category of the first data. A higher data programming rate of the storage unit indicates a higher data read rate of the storage unit. After a read request is obtained, data can be read from a storage unit of a corresponding type. This can avoid a low read rate caused by "reading data from the TLC storage area after all data in the SLC storage area is migrated to the TLC storage area" in a conventional technology, and can implement high-density data storage.

In a possible design, that the processing apparatus indicates the storage apparatus to store the first data in the second type of storage unit includes: If a remaining storage capacity in the storage apparatus is less than a first threshold, the processing apparatus indicates the storage apparatus to store the first data in the second type of storage unit. The programming rate of the first type of storage unit is higher than a programming rate of the second type of storage unit.

In this case, a lower programming rate of a storage unit indicates a higher storage density. When the remaining storage capacity in the storage apparatus is less than the first threshold, the processing apparatus determines data to be migrated from a "storage unit having a higher programming rate" to a "storage unit having a lower programming rate". This implements high-density data storage, and improves a storage capacity of the storage apparatus.

According to a second aspect, an embodiment of this disclosure provides a data storage method. The method may be performed by a storage apparatus, or may be performed by a storage controller used in the storage apparatus. The storage apparatus further includes at least two types of storage units. Different types of storage units have different data programming rates. The following describes an example in which the method is performed by the storage apparatus. The method includes: A storage controller receives first indication information, and stores first data in a first type of storage unit based on the first indication information. The first indication information indicates to store the first data in the first type of storage unit, the first type is determined based on a first category, and the first data is carried in a write request.

In a possible design, the data storage method in this embodiment of this disclosure further includes: The storage controller receives second indication information, and migrates the first data from the first type of storage unit to a second type of storage unit based on the second indication information. The second indication information indicates to store the first data in the second type of storage unit, and the second type is determined based on a second category.

In a possible design, the storage units include at least two of the following types of units: a single level cell SLC, a multi-level cell MLC, a triple level cell TLC, and a quad level cell QLC.

According to a third aspect, an embodiment of this disclosure provides a processing apparatus. The processing apparatus is located in a data storage system. The data storage system further includes a storage apparatus. The storage apparatus includes at least two types of storage units. Different types of storage units have different data programming rates. The processing apparatus includes an obtaining unit, a determining unit, and a communication unit. The obtaining unit is configured to obtain a write request. The write request includes first data to be written. The determining unit is configured to: determine, based on at least one of an access feature and a service requirement of the first data, a first category of the first data at a current moment. The first category indicates a programming rate requirement of the first data. The communication unit is configured to indicate the storage apparatus to store the first data in a first type of storage unit. The first type is determined based on the first category.

In a possible design, the storage apparatus further includes a storage controller. The communication unit is configured to send first indication information to the storage controller. The first indication information indicates the storage controller to store the first data in the first type of storage unit.

In a possible design, a programming rate of the first type of storage unit meets the programming rate requirement indicated by the first category.

In a possible design, the access feature includes at least one of an access frequency and an access category. The access category is classified based on the access frequency.

In a possible design, the access feature includes the access frequency. A higher access frequency indicates a higher programming rate requirement of the first data indicated by the first category.

In a possible design, the at least two types of storage units include a single level cell SLC and a triple level cell TLC. The access feature includes the access category. If the access category is a hot data category, the first type of storage unit is the SLC. If the access category is a cold data category, the first type of storage unit is the TLC.

In a possible design, the service requirement includes at least one of a latency requirement and a latency category.

In a possible design, the service requirement includes the latency requirement. A higher latency requirement indicates a higher programming rate requirement of the first data indicated by the first category.

In a possible design, the at least two types of storage units include the SLC and the TLC. The service requirement includes the latency category. If the latency category is a latency-sensitive category, the first type of storage unit is the SLC. If the latency category is a latency-insensitive category, the first type of storage unit is the TLC.

In a possible design, the at least two types of storage units include the SLC and the TLC. The service requirement includes the latency category. If the latency category is a foreground thread latency category, the first type of storage unit is the SLC. If the latency category is a background thread latency category, the first type of storage unit is the TLC.

In a possible design, the determining unit is further configured to: determine, based on at least one of the access feature and the service requirement of the first data, a second category of the first data at a first moment. The second category indicates a programming rate requirement of the first data, and the first moment is later than the current moment. The communication unit is further configured to indicate the storage apparatus to store the first data in a second type of storage unit. The second type is determined based on the second category.

In a possible design, the communication unit is configured to: if a remaining storage capacity in the storage apparatus is less than a first threshold, indicate the storage apparatus to store the first data in the second type of storage unit. The programming rate of the first type of storage unit is higher than a programming rate of the second type of storage unit.

According to a fourth aspect, an embodiment of this disclosure provides a storage apparatus. The storage apparatus includes a communication unit, a processing unit, and at least two types of storage units. Different types of storage units have different data programming rates. The communication unit is configured to receive first indication information. The first indication information indicates to store first data in a first type of storage unit, the first type is determined based on a category of the first data at a first moment, and the first data is carried in a write request. The processing unit is configured to store the first data in the first type of storage unit based on the first indication information.

In a possible design, the communication unit is further configured to receive second indication information. The second indication information indicates to store the first data in a second type of storage unit, and the second type is determined based on a category of the first data at a second moment. The processing unit is further configured to migrate the first data from the first type of storage unit to the second type of storage unit based on the second indication information.

In a possible design, the storage units include at least two of the following types of units: a single level cell SLC, a multi-level cell MLC, a triple level cell TLC, and a quad level cell QLC.

According to a fifth aspect, an embodiment of this disclosure provides a processing apparatus, including a processor and an interface circuit. The processor is configured to communicate with another apparatus through the interface circuit, and perform the data storage method according to any one of the first aspect or the possible designs of the first aspect. There are one or more processors.

According to a sixth aspect, an embodiment of this disclosure provides a processing apparatus, including a processor, configured to connect to a memory, and configured to invoke a program stored in the memory, to perform the data storage method according to any one of the first aspect or the possible designs of the first aspect. The memory may be located inside or outside the processing apparatus. There are one or more processors.

According to a seventh aspect, an embodiment of this disclosure provides a processing apparatus, including at least one processor and at least one memory. The at least one processor is configured to perform the data storage method according to any one of the first aspect or the possible designs of the first aspect.

According to an eighth aspect, an embodiment of this disclosure provides a processor, applied to a data storage system. The data storage system further includes a storage apparatus. The storage apparatus includes at least two types of storage units. Different types of storage units have different data programming rates. The processor is configured to obtain a write request. The write request includes first data to be written. The processor is further configured to: determine, based on at least one of an access feature and a service requirement of the first data, a first category of the first data at a current moment. The first category indicates a programming rate requirement of the first data. The processor is further configured to indicate the storage apparatus to store the first data in a first type of storage unit. The first type is determined based on the first category.

In a possible design, the storage apparatus further includes a storage controller. The processor is configured to send first indication information to the storage controller. The first indication information indicates the storage controller to store the first data in the first type of storage unit.

In a possible design, a programming rate of the first type of storage unit meets the programming rate requirement indicated by the first category.

In a possible design, the access feature includes at least one of an access frequency and an access category. The access category is classified based on the access frequency.

In a possible design, the access feature includes the access frequency. A higher access frequency indicates a higher programming rate requirement of the first data indicated by the first category.

In a possible design, the at least two types of storage units include a single level cell SLC and a triple level cell TLC. The access feature includes the access category. If the access category is a hot data category, the first type of storage unit is the SLC. If the access category is a cold data category, the first type of storage unit is the TLC.

In a possible design, the service requirement includes at least one of a latency requirement and a latency category.

In a possible design, the service requirement includes the latency requirement. A higher latency requirement indicates a higher programming rate requirement of the first data indicated by the first category.

In a possible design, the at least two types of storage units include the SLC and the TLC. The service requirement includes the latency category. If the latency category is a latency-sensitive category, the first type of storage unit is the SLC. If the latency category is a latency-insensitive category, the first type of storage unit is the TLC.

In a possible design, the at least two types of storage units include the SLC and the TLC. The service requirement includes the latency category. If the latency category is a foreground thread latency category, the first type of storage unit is the SLC. If the latency category is a background thread latency category, the first type of storage unit is the TLC.

In a possible design, the processor is further configured to: determine, based on at least one of the access feature and the service requirement of the first data, a second category of the first data at a first moment. The second category indicates a programming rate requirement of the first data, and the first moment is later than the current moment. The processor is further configured to indicate the storage apparatus to store the first data in a second type of storage unit. The second type is determined based on the second category.

In a possible design, the processor is configured to: if a remaining storage capacity in the storage apparatus is less than a first threshold, indicate the storage apparatus to store the first data in the second type of storage unit. The programming rate of the first type of storage unit is higher than a programming rate of the second type of storage unit.

According to a ninth aspect, an embodiment of this disclosure provides a computer-readable storage medium. The computer-readable storage medium stores instructions. When the instructions are run on a computer, the computer is enabled to perform the data storage method according to any one of the first aspect or the possible designs of the first aspect.

According to a tenth aspect, an embodiment of this disclosure provides a computer program product including instructions. When the computer program product runs on a computer, the computer is enabled to perform the data storage method according to any one of the first aspect or the possible designs of the first aspect.

According to an eleventh aspect, an embodiment of this disclosure provides a circuit system. The circuit system includes a processing circuit. The processing circuit is configured to perform the data storage method according to any one of the first aspect or the possible designs of the first aspect.

According to a twelfth aspect, an embodiment of this disclosure provides a chip. The chip includes a processor. The processor is coupled to a memory. The memory stores program instructions. When the program instructions stored in the memory are executed by the processor, the data storage method according to any one of the first aspect or the possible designs of the first aspect is implemented.

According to a thirteenth aspect, an embodiment of this disclosure provides a data storage system. The data storage system includes a processor, a storage controller, and a storage array. The storage array includes at least two types of storage units. Different types of storage units have different data programming rates. The processor is configured to obtain a write request. The write request includes first data to be written. The processor is further configured to: determine, based on at least one of an access feature and a service requirement of the first data, a first category of the first data at a current moment. The first category indicates a programming rate requirement of the first data. The processor is further configured to indicate the storage controller to store the first data in a first type of storage unit. The first type is determined based on the first category.

In a possible design, the processor is configured to send first indication information to the storage controller. The storage controller is configured to receive the first indication information from the processor. The first indication information indicates the storage controller to store the first data in the first type of storage unit. The storage controller is configured to store the first data in the first type of storage unit based on the first indication information.

In a possible design, a programming rate of the first type of storage unit meets the programming rate requirement indicated by the first category.

In a possible design, the access feature includes at least one of an access frequency and an access category. The access category is classified based on the access frequency.

In a possible design, the access feature includes the access frequency. A higher access frequency indicates a higher programming rate requirement of the first data indicated by the first category.

In a possible design, the at least two types of storage units include a single level cell SLC and a triple level cell TLC. The access feature includes the access category. If the access category is a hot data category, the first type of storage unit is the SLC. If the access category is a cold data category, the first type of storage unit is the TLC.

In a possible design, the service requirement includes at least one of a latency requirement and a latency category.

In a possible design, the service requirement includes the latency requirement. A higher latency requirement indicates a higher programming rate requirement of the first data indicated by the first category.

In a possible design, the at least two types of storage units include the SLC and the TLC. The service requirement includes the latency category. If the latency category is a latency-sensitive category, the first type of storage unit is the SLC. If the latency category is a latency-insensitive category, the first type of storage unit is the TLC.

In a possible design, the at least two types of storage units include the SLC and the TLC. The service requirement includes the latency category. If the latency category is a foreground thread latency category, the first type of storage unit is the SLC. If the latency category is a background thread latency category, the first type of storage unit is the TLC.

In a possible design, the processor is further configured to: determine, based on at least one of the access feature and the service requirement of the first data, a second category of the first data at a first moment. The second category indicates a programming rate requirement of the first data. The first moment is later than the current moment. The processor is further configured to indicate the storage controller to store the first data in a second type of storage unit. The second type is determined based on the second category.

In a possible design, the processor is configured to: if a remaining storage capacity in the storage array is less than a first threshold, indicate the storage controller to store the first data in the second type of storage unit. The programming rate of the first type of storage unit is higher than a programming rate of the second type of storage unit.

In a possible design, the storage units include at least two of the following types of units: a single level cell SLC, a multi-level cell MLC, a triple level cell TLC, and a quad level cell QLC.

For technical effect brought by any design manner of the second aspect to the thirteenth aspect, refer to technical

DESCRIPTION OF EMBODIMENTS

Figure 1:
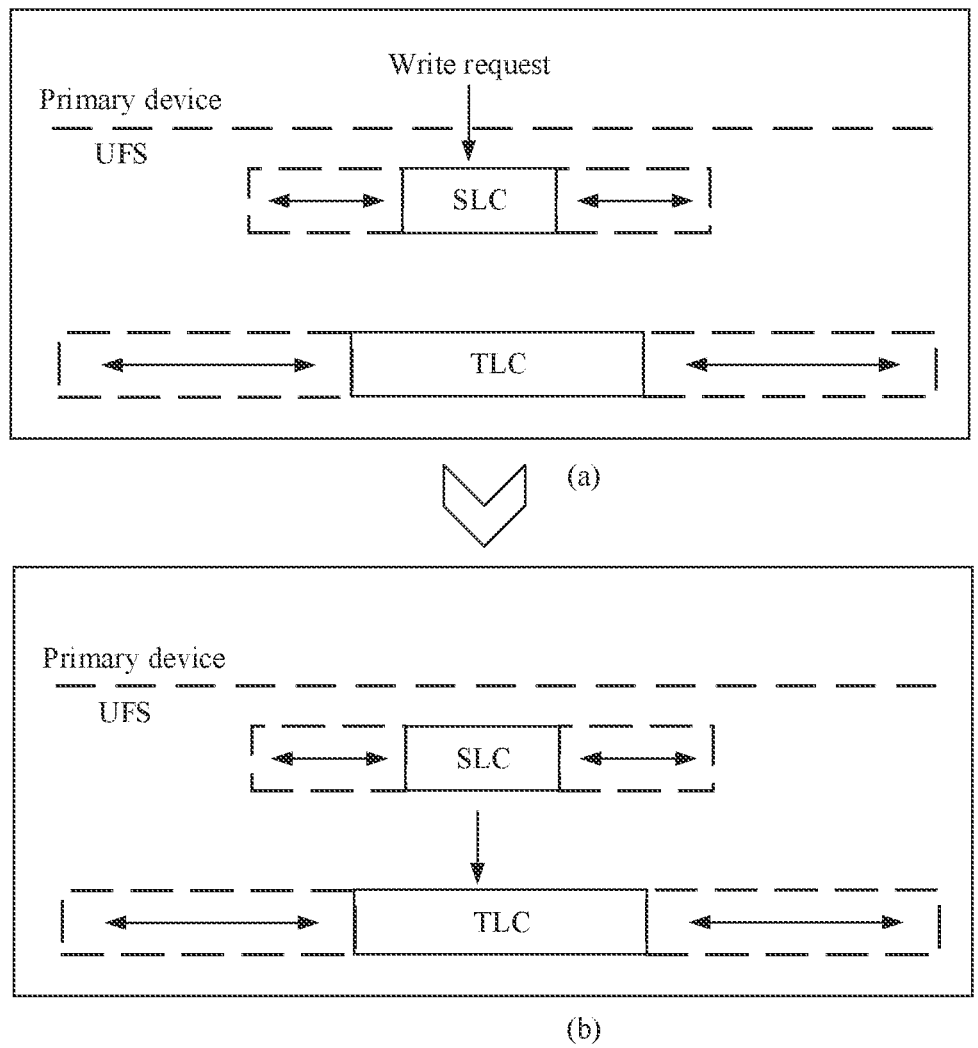
FIG. 1 is a schematic flowchart of a data storage method according to an embodiment of this disclosure.

In the specification and accompanying drawings of this disclosure, the terms "first", "second", and the like are intended to distinguish between different objects or distinguish between different processing of a same object, but do not indicate a particular order of the objects. In addition, the terms "including", "having", or any other variant thereof in descriptions of this disclosure are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. In embodiments of this disclosure, the word "example" or "for example" or the like is used to represent giving an example, an illustration, or a description. Any embodiment or design scheme referred to as an "example" or "for example" in embodiments of this disclosure should not be explained as being more preferred or having more advantages than another embodiment or design scheme. Exactly, use of the word "example", "for example", or the like is intended to present a related concept in a specific manner.

For ease of understanding embodiments of this disclosure, related elements in embodiments of this disclosure are first explained.

1. Cold Data and Hot Data

The cold data and hot data each have a plurality of definitions. For example, when classification is performed by "access frequency", the cold data is data whose access frequency is less than or equal to a first frequency threshold, for example, downloaded audio data or downloaded image data. The hot data is data whose access frequency is higher than a second frequency threshold, for example, data in a base library on which an disclosure is based. The access frequency includes a read frequency and a rewrite frequency. The first frequency threshold and the second frequency threshold may be same, or may be different.

2. Foreground and Background Disclosures

An disclosure on a communication device is usually classified into two types: a foreground disclosure and a background disclosure.

The foreground disclosure is an disclosure running in the foreground of an operating system (OS). A screen of the communication device may display an interface of the disclosure, and execute a related function of the disclosure. For example, an interface of a video disclosure is displayed on the screen of the communication device. The video disclosure can process a tap event of a user, play a video, and the like. Usually, the foreground disclosure requires a low latency for to-be-processed data, to meet a user requirement and avoid "freezing".

A background disclosure is an disclosure running in the background of the operating system. This disclosure is executed by the operating system in the background. The screen of the communication device may not display an interface of the disclosure, and a function of the disclosure is limited. The video disclosure is still used as an example, and in this case, the interface of the video disclosure is not displayed on the screen of the communication device. The video disclosure does not process a tap event of the user, and stops playing the video. Usually, the background disclosure requires a latency for to-be-processed data higher than that required by the foreground disclosure.

3. Latency-Sensitive and Latency-Insensitive

The terms "latency-sensitive" and "latency-insensitive" each have a plurality of definitions. For example, w % ben classification is performed by "latency requirement", if the latency requirement requires a latency lower than or equal to a first latency threshold, the latency requirement is "latency-sensitive". For example, a write request sent by a game disclosure is mostly a latency-sensitive write request. If the requirement requires a latency higher than a second latency threshold, the latency requirement is "latency-insensitive". For example, a write request sent by a web browsing disclosure is mostly a latency-insensitive write request.

4. UFS

The UFS is usually used as a storage device of a communication device such as a smartphone, a television, or a tablet computer. Currently, most UFS includes a storage controller and a storage array. A minimum unit of the storage array is referred to as a storage unit (cell). The storage unit is designed based on a floating gate transistor, and uses a floating gate to latch a charge. The charge is stored in the floating gate and may be retained even when no power supply is available, to record information.

The floating gate transistor may obtain a threshold voltage of the transistor based on whether the floating gate stores a charge or a quantity of stored charges, and indicate information by using the obtained threshold voltage of the transistor. One floating gate transistor corresponds to one storage unit. Based on different information bits stored in one storage unit, a storage unit may be classified into the following types, an SLC, an MLC, a TLC, and a QLC.

For the SLC-type storage unit, charges in a floating gate in a floating gate transistor are divided into two levels, to separately indicate one information bit (that is, 0 and 1). The SLC-type storage unit may also be referred to as a floating gate transistor in an SLC mode. The SLC-type storage unit has a long service life, a high read or write rate, a low storage density, and the like. A quantity of erase times of the SLC-type storage unit ranges from 50,000 to 100,000.

For the MLC-type storage unit, charges in a floating gate in a floating gate transistor are divided into four levels, to separately indicate two information bits (that is, 00, 01, 10, and 11). The MLC-type storage unit may also be referred to as a floating gate transistor in an MLC mode. The MLC-type storage unit has a shorter service life, a lower read or write rate, a higher storage density, and the like. A quantity of erase times of the MLC-type storage unit is about 3000.

For the TLC-type storage unit, charges in a floating gate in a floating gate transistor are divided into eight levels, to separately indicate three information bits (that is, 000, 001, 010, 011, 100, 101, 110, and 111). The TLC-type storage unit may also be referred to as a floating gate transistor in a TLC mode. The TLC-type storage unit has a short service life, a low read or write rate, a high storage density, and the like. A quantity of erase times of the TLC-type storage unit is about hundreds.

For the QLC-type storage unit, charges in a floating gate in a floating gate transistor are divided into sixteen levels, to separately indicate four information bits (that is, 0000, 0001, 0010, 0011, 0100, 0101, 0110, 0111, 1000, 1001, 1010, 1011, 1100, 1101, 1110, and 1111). The QLC-type storage unit may also be referred to as a floating gate transistor in a QLC mode. The QLC-type storage unit has a higher storage density than that of the TLC-type storage unit. The QLC-type storage unit has a lower read or write rate, a smaller quantity of erase times, and a shorter service life than those of the TLC-type storage unit.

It should be noted that the "SLC-type storage unit" may also be referred to as an "SLC storage unit", the "MLC-type storage unit" may also be referred to as an "MLC storage unit", the "TLC-type storage unit" may also be referred to as a "TLC storage unit", and the "QLC-type storage unit" may also be referred to as a "QLC storage unit". The write rate in the "read or write rate" may also be referred to as a "programming rate". The programming rate is a rate at which data is written into an SLC storage unit, an MLC storage unit, a TLC storage unit, a QLC storage unit, or the like.

Generally, the storage array is divided by "block" to obtain a plurality of storage areas. One block includes at least one storage unit, and storage units in one block belong to a same type. Blocks of a same type form a storage area of a same type. For example, a plurality of SLC-type blocks form an SLC storage area, a plurality of MLC-type blocks form an MLC storage area, and a plurality of TLC-type blocks form a TLC storage area.

The UFS uses the following processing manners to improve read and write performance of the UFS:

Manner 1: The read and write performance of the UFS is improved by dynamically configuring an SLC storage area The storage controller determines a size of the SLC storage area based on a remaining storage capacity in the storage array. The remaining storage capacity in the storage array is determined based on an occupied storage capacity in the SLC storage area and an occupied storage capacity in a TLC storage area. A smaller remaining storage capacity that is in the storage array and that is determined by the storage controller indicates a smaller configured SLC storage area. Otherwise, a larger remaining storage capacity indicates a larger configured SLC storage area. Refer to FIG. 1. A solid-line box marked with "SLC" indicates a current SLC storage area. The dashed-line boxes on both sides of the solid-line box marked with "SLC" indicate that a location and size of the SLC storage area may change dynamically. Similarly, a solid-line box marked with "TLC" indicates a current TLC storage area. A size of the storage array including the SLC storage area and the TLC storage area is fixed, and the SLC storage area changes dynamically. Therefore, the TLC storage area also changes dynamically. This is indicated by dashed-line boxes on both sides of the solid-line box marked with "TLC". In addition, the SLC storage area may also be referred to as an SLC cache area.

Refer to (a) in FIG. 1. The storage controller receives a write request from a primary device. The primary device is a device that accesses the UFS. One or more disclosures are installed on the primary device. The write request includes data to be written. The storage controller writes the data in the received write request into the SLC storage area in response to the received write request, to improve a write rate of the UFS.

Refer to (b) in FIG. 1. When no write request is received by the storage controller, the storage controller migrates data stored in the SLC storage area to the TLC storage area. This enables the SLC storage area to cache data in a next write request received by the storage controller, avoids exhausting storage space of the SLC storage area, and ensures stability of the write rate of the UFS. The "migration" process copies the data to another blank area, and then performs a deletion operation, to change a type of a storage unit used to store the data. A piece of data may be stored in a first type of storage unit. After migration, the data is stored in a second type of storage unit, and the data stored in the first type of storage unit is deleted. The "migration" process described by using an example in which "data stored in the SLC storage area is migrated to the TLC storage area" uses the TLC storage area to store the data in the SLC storage area, and deletes the data stored in the SLC storage area. The migration is performed by a "block".

Figure 2:
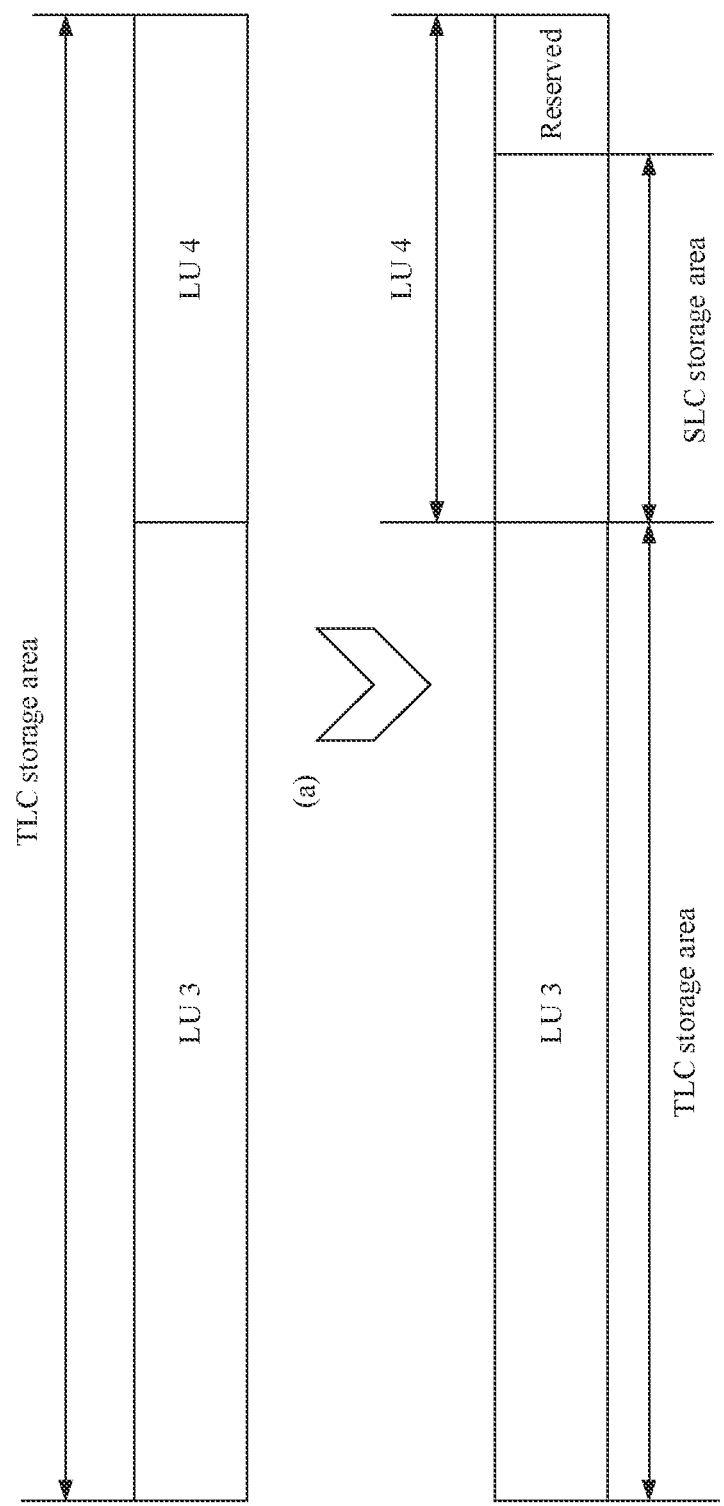
FIG. 2 is a schematic flowchart of another data storage method according to an embodiment of this disclosure.

Manner 2: The read and write performance of the UFS is improved by configuring a fixed SLC storage area The SLC storage area of the UFS is fixed. Refer to (a) in FIG. 2. Before the fixed SLC storage area is configured, two logical units (LU) in the UFS are used as TLC storage areas. Logical unit numbers (LUN) of the two LUs are respectively an LU 3 and an LU 4. A capacity of the LU 3 is 196 GB, and a capacity of the LU 4 is 60 GB. Refer to (b) in FIG. 2. After the fixed SLC storage area is configured, the LU 3 is still used as a TLC storage area, and a part of a storage area in the LU 4 is used as an SLC storage area. Another part of the storage area in the LU 4 is used as a reserved area.

The UFS installs an disclosure in the SLC storage area. The disclosure installed in the SLC storage area may be an disclosure that frequently accesses the UFS. Generally, an disclosure that frequently accesses the UFS has a higher programming rate requirement. Related data, for example, data read or overwritten by a thread in the disclosure, or audio data and image data downloaded by using the disclosure, of the disclosure is stored in the SLC storage area. Because the SLC storage area has a higher programming rate, the SLC storage area can quickly store data in a write request of the disclosure, and can also provide data in a read request for the disclosure, to meet an actual requirement of the disclosure in the SLC storage area.

When the storage controller continuously receives write requests and writes data in the write requests into the SLC storage area, the SLC storage area may store excessive data, and the storage space is quickly exhausted. The storage controller writes data in a subsequently received write request into the TLC storage area. In this case, the write rate of the UFS decreases and performance deteriorates.

Figure 3:
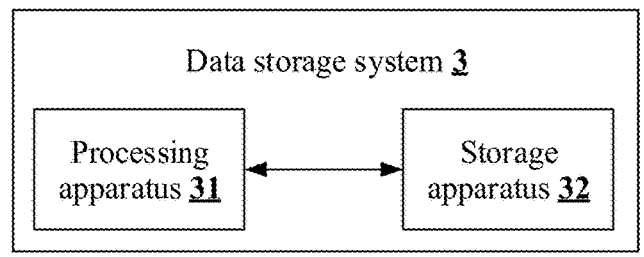
FIG. 3 is a schematic diagram of an architecture of a data storage system according to an embodiment of this disclosure.

In view of this, an embodiment of this disclosure provides a data storage method. The following describes a data storage system to which the data storage method in this embodiment of this disclosure is applicable. Refer to FIG. 3. The data storage system includes a processing apparatus 31 and a storage apparatus 32. The processing apparatus 31 is communicatively connected to the storage apparatus 32. There may be one or more processing apparatuses 31, and there may also be one or more storage apparatuses 32. FIG. 3 shows only one processing apparatus 31 and one storage apparatus 32. FIG. 3 is merely a schematic diagram, and does not constitute any limitation on an disclosure scenario of the data storage method in embodiments of this disclosure.

The processing apparatus 31 is a control center of the data storage system. The processing apparatus 31 is connected to parts of the entire data storage system by using various interfaces and lines, and manages the entire data storage system by running or executing a software program and/or an disclosure module. For example, the processing apparatus 31 determines to write to-be-written data in a write request into which type of storage unit in the storage apparatus 32, and determines a remaining storage capacity in the storage apparatus 32. One or more disclosures may run on the processing apparatus 31.

The storage apparatus 32 is used to store data, for example, data downloaded by the processing apparatus 31 by using an disclosure. The storage apparatus 32 may be an embedded multimedia card (eMMC), UFS, a NAND flash memory, or the like.

Optionally, the processing apparatus 31 and the storage apparatus 32 may be located in a same communication device. The communication device may be a mobile phone, a television, a speaker, a tablet computer, a wearable device, a vehicle-mounted device, an augmented reality (AR) device, a virtual reality (VR) device, a desktop, laptop, or handheld notebook computer, an ultra-mobile personal computer (UMPC), a netbook, a personal digital assistant (PDA), a camera, or the like.

Figure 4:
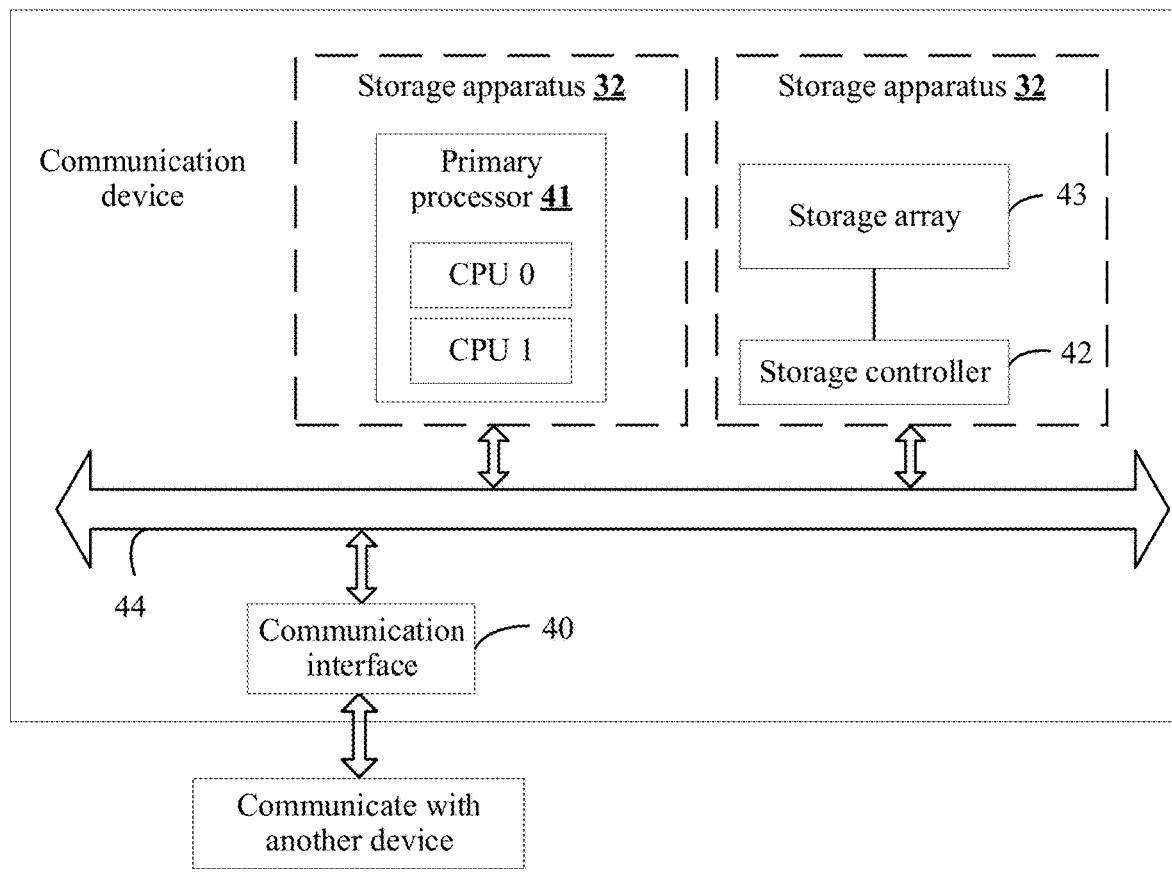
FIG. 4 is a schematic diagram of an architecture of hardware of a communication device according to an embodiment of this disclosure.

FIG. 4 is a schematic diagram of a structure of a communication device according to an embodiment of this disclosure. The communication device includes a communication interface 40, a primary processor 41, a storage controller 42, and a storage array 43. The communication interface 40, the primary processor 41, and the storage controller 42 are connected by using a system bus 44, to implement communication with each other.

The communication interface 40 is configured to communicate with another device, for example, perform message transmission with another device.

The primary processor 41 is configured to implement a function of the processing apparatus 31 in FIG. 3. The primary processor 41 may only include a central processing unit (CPU), or may be a CPU, a digital signal processor (DSP), an disclosure-specific integrated circuit (disclosureASIC), a field-programmable gate array (FPGA) or another programmable logical device, a transistor logical device, a hardware component, or any combination thereof. In an implementation of this disclosure, the CPU may be a single computing core, or may include a plurality of computing cores. In a specific implementation, in an embodiment, the primary processor 41 may include one or more CPUs. For example, the primary processor 41 in FIG. 4 includes a CPU 0 and a CPU 1.

Figure 5:
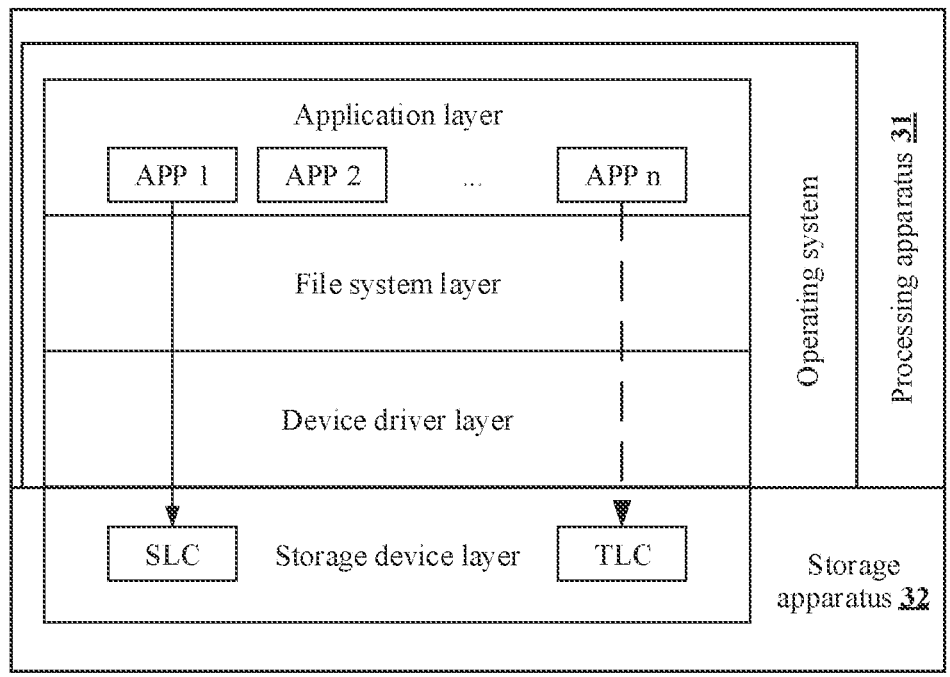
FIG. 5 is a schematic diagram of layers of a communication protocol supported by a communication device according to an embodiment of this disclosure.

The primary processor 41 may execute different operating systems, including but not limited to a Linux operating system. The following uses a primary processor 41 executing the Linux operating system as an example. For example, FIG. 5 is a schematic diagram of layers of a Linux operating system according to an embodiment of this disclosure. For example, the Linux operating system includes an disclosure layer, a file system layer, and a device driver layer.

The disclosure layer includes an disclosure installed on a communication device. The disclosure may be a native disclosure disclosure (for example, settings, desktop, and file management), or may be a third-party disclosure (for example, WeChat or a browser).

The file system layer provides a structured data storage and organization form, and organizes a file topology based on a tree structure, to provide convenience for a user to gain access to and query a file. A file system at the file system layer may be a flash friendly file system (F2FS), a fourth extended file system (EXT4), or the like.

The device driver layer is used to implement format conversion. For example, a request (or message) from the file system layer is converted into a format that can be identified by a storage device layer. Then, a request (or message) after format conversion is sent to the storage device layer. Alternatively, format conversion is performed on a message from the storage device layer, to convert the message into a message that can be identified by the file system layer. Then, a message obtained after format conversion is sent to the file system layer.

The storage controller 42 is configured to run program instructions, to manage the storage array 43, for example, perform read, write, and erase operations on the storage array 43 and address space management. The storage controller 42 may be implemented by using a control chip.

The storage array 43 is configured to store data. A storage unit of the storage array 43 is designed based on a floating gate transistor, and includes at least two of the following types: an SLC, an MLC, a TLC, and a QLC. Generally, the communication device uses an SLC-type storage unit to improve a data write rate, and uses an MLC-type storage unit, a TLC-type storage unit, or a QLC-type storage unit to improve a storage density.

The storage controller 42 and the storage array 43 jointly implement a function of the storage apparatus 32 in FIG. 3. When the primary processor 41 executes the Linux operating system, the storage controller 42 and the storage array 43 jointly implement the storage device layer in FIG. 5.

The system bus 44 may be a circuit that interconnects the foregoing elements and transfers communication between the foregoing elements. For example, the system bus 44 is an industrial standard architecture (ISA) bus, a peripheral component interconnect (PCI) bus, an extended industry standard architecture (EISA) bus, or an advanced microcontroller bus architecture (AMBA). The system bus 44 may be classified into an address bus, a data bus, a control bus, and the like. In this embodiment of this disclosure, for clear description, various buses in FIG. 4 are all illustrated as the system bus 44.

Optionally, the processing apparatus 31 and the storage apparatus 32 may alternatively be located in different communication devices. This is not limited in embodiments of this disclosure.

The data storage system and a service scenario described in embodiments of this disclosure are intended to describe the technical solutions in embodiments of this disclosure more clearly, but constitute no limitation on the technical solutions provided in embodiments of this disclosure. A person of ordinary skill in the art may learn that the technical solutions provided in embodiments of this disclosure are also applicable to a similar technical problem as a system architecture evolves and a new service scenario emerges.

The following describes in detail the data storage method provided in embodiments of this disclosure.

It should be noted that in the following embodiments of this disclosure, names of messages between apparatuses, names of parameters in messages, or the like are merely examples, and may be other names during specific implementation. This is uniformly described herein, and details are not described below again.

Figure 6A:
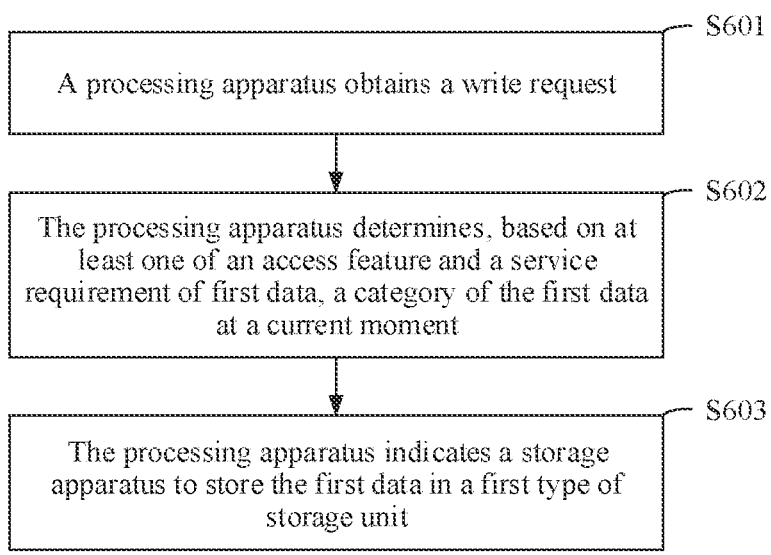
FIG. 6(a) is a schematic flowchart of a data storage method according to an embodiment of this disclosure.

An embodiment of this disclosure provides a data storage method, and the data storage method is applied to a data storage process. Refer to FIG. 6(a). The data storage method includes the following steps.

S601: A processing apparatus obtains a write request.

The write request includes first data to be written. The write request is a request sent by an disclosure.

As described above, the processing apparatus includes an disclosure layer and a file system layer. Refer to FIG. 5. For example, the disclosure layer includes n disclosures (that is, an APP 1, an APP 2, . . . , and an APP n), the APP 1 is used as an example, and the APP 1 belongs to a foreground disclosure. During running of the APP 1, the APP 1 sends a write request to the file system layer, to request to write data after a variable i is re-assigned into a storage apparatus. In this case, that the processing apparatus obtains the write request includes: The disclosure layer in the processing apparatus generates the write request. In this case, the first data is the data after the variable i is re-assigned". A solid line with an arrow in FIG. 5 shows a transmission process of the write request sent by the APP 1.

The APP n is used as an example. The APP n belongs to a background disclosure. The APP n sends a write request to the file system layer to request to write downloaded video, picture, or other image data into the storage apparatus. In this case, the first data is the "image data". A dashed line with an arrow in FIG. 5 shows a transmission process of the write request sent by the APP n.

S602: The processing apparatus determines, based on at least one of an access feature and a service requirement of the first data, a category of the first data at a current moment.

The category of the first data at the current moment is denoted as a category 1. The category 1 indicates a programming rate requirement of the first data. In this case, different categories indicate different programming rate requirements. For example, a first category indicates a high programming rate requirement, and a second category indicates a low programming rate requirement. That different categories correspond to different programming rate ranges is used as an example. A programming rate corresponding to the first category is lower than a programming rate corresponding to the second category. Certainly, there may further be a third category indicating a programming rate requirement. A programming rate corresponding to the second category is lower than a programming rate corresponding to the third category. There may further be a fourth category or more categories separately indicating a programming rate requirement, and programming rates corresponding to different categories can be deduced by analogy.

The access feature includes at least one of an access frequency and an access category. When the access feature includes the access frequency, a higher access frequency of the first data indicates a higher programming rate requirement of the first data indicated by the category 1, to reduce a data write time and improves system performance. When the access feature includes the access category, the access category is classified based on the access frequency. For example, the access category includes a hot data category and a cold data category. An access frequency of the hot data category is higher than that of the cold data category. Therefore, if the access category of the first data is the hot data category, the first data has a higher programming rate requirement. If the access category of the first data is the cold data category, the first data has a lower programming rate requirement. This improves overall system performance.

The service requirement includes at least one of a latency requirement and a latency category. When the service requirement includes the latency requirement, a higher latency requirement indicates a higher programming rate requirement of the first data indicated by the category 1, to reduce system freezing. When the service requirement includes the latency category, for example, the latency category is classified into a latency-sensitive category and a latency-insensitive category, Generally, if the latency category of the first data is the latency-sensitive category, the first data has a higher latency requirement and a higher programming rate requirement. If the latency category of the first data is the latency-insensitive category, the first data has a lower latency requirement and a lower programming rate requirement. For another example, the latency category may also be classified into a foreground thread latency category and a background thread latency category. Generally, a foreground thread has a higher latency requirement than that of a background thread. Therefore, if the latency category of the first data is the foreground thread latency category, the first data has a higher programming rate requirement. If the latency category of the first data is the background thread latency category, the first data has a lower programming rate requirement. This also improves system performance.

The following describes a specific implementation process of S602 in three cases.

Case 1: That "the processing apparatus determines the category of the first data at the current moment based on the access feature of the first data" is referred to as follows.

Because the access feature includes at least one of the access frequency and the access category, the following three examples are provided herein.

Example 1: The processing apparatus determines a category of the first data at the current moment based on the access frequency of the first data.

During actual disclosure, the first data is presented by using a file in a format. In this case, a name extension of the file can indicate an access frequency of the file, for example, the access frequency of the first data. For example, if the name extension of the file is "JPG", the file is a picture, and the picture has a lower access frequency. According to a rule between an access frequency and a programming rate, a higher access frequency of the first data indicates a higher programming rate requirement of the first data. On the contrary, a lower access frequency of the first data indicates a lower programming rate requirement of the first data. The processing apparatus may determine, based on the access frequency, that the category 1 of the first data (namely the picture) is the first category. For another example, a file whose name extension is "EXE" is an executable file, and the executable file has a higher access frequency. The processing apparatus may determine, based on the access frequency, that the category 1 of the first data (namely the executable file) is the second category.

Example 2: The processing apparatus determines a category of the first data at the current moment based on the access category of the first data.

For example, the scenario shown in FIG. 5 is still used as an example. As described above, the processing apparatus includes the disclosure layer and the file system layer. At the file system layer, a file system identifies that the "data after the variable i is re-assigned" is frequently accessed. In other words, the "data after the variable i is re-assigned" is the first data, and belongs to hot data, that is, the access category of the first data is the hot data category. The file system determines that the first data in the write request sent by the APP 1 belongs to the second category. Alternatively, the file system identifies that image data is accessed less frequently. In other words, the "image data" is the first data, and belongs to cold data, that is, the access category of the first data is the cold data category. The file system determines that the first data in the write request sent by the APP n belongs to the first category.

For another example, the scenario shown in FIG. 5 is still used as an example. As described above, the processing apparatus includes the disclosure layer and the file system layer. The write request sent by the APP 1 includes indication information indicating the "hot data category". At the file system layer, the file system identifies the indication information indicating the "hot data category" in the write request sent by the APP 1, and determines that the first data in the write request sent by the APP 1 belongs to the second category. Alternatively, the write request sent by the APP n includes indication information indicating the "cold data category". At the file system layer, the file system identifies the indication information indicating the "cold data category" in the write request sent by the APP n, and determines that the first data in the write request sent by the APP n belongs to the first category.

Example 3: The processing apparatus determines the category of the first data at the current moment based on the access frequency and the access category of the first data.

First, the processing apparatus separately determines a category of the first data at the current moment based on the access frequency and the access category. For details, refer to related descriptions in Example 1 and Example 2. Details are not described herein again.

Then, if the category determined "based on the access frequency" is the same as the category determined "based on the access category", the processing apparatus uses the category determined "based on the access frequency" as the category of the first data at the current moment. If the category determined "based on the access frequency" is different from the category determined "based on the access category", the processing apparatus determines the category of the first data at the current moment according to a preset rule. For example, when a remaining storage capacity of the storage array is less than a threshold 1, the processing apparatus uses a category having a lower programming rate as the category of the first data at the current moment. When a remaining storage capacity of the storage array is greater than or equal to the threshold 1, the processing apparatus uses a category having a higher programming rate as the category of the first data at the current moment.

Case 2: That "the processing apparatus determines the category of the first data at the current moment based on the service requirement of the first data" is referred to as follows.

Because the service requirement includes at least one of the latency requirement and the latency category, three examples are still provided herein for description.

Example 4: The processing apparatus determines the category of the first data at the current moment based on the latency requirement of the first data.

During actual disclosure, the processing apparatus complies with a rule between a latency requirement and a programming rate. To be specific, a higher latency requirement of the first data indicates a higher programming rate requirement of the first data. On the contrary, a lower latency requirement of the first data indicates a lower programming rate requirement of the first data. The processing apparatus may determine, based on the latency requirement, a category of the first data. For example, a category 1 of first data in a write request having a higher latency requirement generally is the second category. A category 1 of first data in a write request having a lower latency requirement is a first category.

Example 5: The processing apparatus determines the category of the first data at the current moment based on the latency category of the first data.

When the processing apparatus determines the latency category based on a thread category to which the first data belongs, the latency category includes the foreground thread latency category and the background thread latency category. In the scenario shown in FIG. 5, as described above, the processing apparatus includes the disclosure layer and the file system layer. The APP 1 at the disclosure layer belongs to the foreground disclosure. At the file system layer, after receiving the write request sent by the APP 1, the file system determines that the write request is a write request sent by the foreground disclosure. In this way, the file system determines that the latency category of the first data in the write request is the foreground thread latency category. Correspondingly, the category 1 of the first data at the current moment is the second category. The foreground disclosure is sensitive to a latency of the first data. If the latency of the first data is high, current system performance is affected or the system freezes. Alternatively, the APP n belongs to the background disclosure. At the file system layer, after receiving the write request sent by the APP n, the file system determines that the write request is a write request sent by the background disclosure. In this way, the file system determines that the latency category of the first data in the write request is the background thread latency category. The background disclosure is less sensitive to the latency than the foreground disclosure. The category 1 of the first data at the current moment is the first category.

For another example, the latency category includes the latency-sensitive category and the latency-insensitive category. In the scenario shown in FIG. 5, as described above, the processing apparatus includes the disclosure layer and the file system layer. The write request sent by the APP 1 at the disclosure layer includes indication information indicating the "latency-sensitive category". At the file system layer, the file system identifies the indication information (namely the indication information indicating the "latency-sensitive category") in the write request sent by the APP 1, and determines that the first data in the write request sent by the APP 1 belongs to the second category. Alternatively, the write request sent by the APP n includes indication information indicating the "latency-insensitive category". At the file system layer, the file system identifies the indication information (namely the indication information indicating the "latency-insensitive category") in the write request sent by the APP n, and determines that the first data in the write request sent by the APP n belongs to the first category.

Example 6: The processing apparatus determines the category of the first data at the current moment based on the latency requirement and the latency category of the first data.

First, the processing apparatus separately determines a category of the first data at the current moment based on the latency requirement and the latency category. For details, refer to related descriptions in Example 4 and Example 5. Details are not described herein again.

Then, if the category determined "based on the latency requirement" is the same as the category determined "based on the latency category", the processing apparatus uses the category determined "based on the latency requirement" as the category of the first data at the current moment. If the category determined "based on the latency requirement" is different from the category determined "based on the latency category", the processing apparatus determines the category of the first data at the current moment according to a preset rule. For a specific processing process, refer to the description in Example 3. Details are not described herein again.

Case 3: That "the processing apparatus determines the category of the first data at the current moment based on the access feature and the service requirement of the first data" is referred to as follows.

First, the processing apparatus separately determines a category of the first data at the current moment based on the access feature and the service requirement. For details, refer to related descriptions in Case 1 and Case 2. Details are not described herein again.

Then, if the category determined "based on the access feature" is the same as the category determined "based on the service requirement", the processing apparatus uses the category determined "based on the access feature" as the category of the first data at the current moment. If the category determined "based on the access feature" is different from the category determined "based on the service requirement", the processing apparatus determines the category of the first data at the current moment according to a preset rule. For a specific processing process, refer to the description in Example 3. Details are not described herein again.

It should be noted that, a service requirement and an access feature of first data in a write request dynamically change. A "latency requirement in the service requirement" is used as an example. At 10:00, a user browses a web page by using an disclosure "browser". In this case, the disclosure "browser" is a foreground disclosure. A write request sent by the disclosure has a higher latency requirement. At 10:02, the user presses a back key or a home key to exit the disclosure "browser". In this case, the disclosure "browser" is a background disclosure. A write request sent by the disclosure has a lower latency requirement. The service requirement and the access feature of the first data dynamically change. Therefore, the processing apparatus determines a category of the first data at a corresponding moment based on a service requirement and an access feature of the first data at different moments. In S602, the processing apparatus determines that the category of the first data is a category of the first data at the current moment. The service requirement of the first data is a service requirement of the first data at the current moment, and the access feature of the first data is also an access feature of the first data at the current moment.

S603: The processing apparatus indicates the storage apparatus to store the first data in a first type of storage unit.

The first type is determined based on the category 1. A programming rate of the first type of storage unit meets the programming rate requirement indicated by the category 1. For example, when the category 1 corresponds to a programming rate range, the programming rate of the first type of storage unit is higher than or equal to a minimum value of the programming rate range corresponding to the category 1. The first type may be, for example, but is not limited to, any one of an SLC, an MLC, a TLC, and a QLC, provided that the programming rate requirement indicated by the category 1 can be met.

For example, the at least two types of storage units include the SLC and the TLC. When classification is performed by "access frequency", if the first data has a higher access frequency, the processing apparatus determines to store the data of the category in a storage unit (for example, the SLC storage unit) having a higher programming rate. This can meet requirements of more threads or disclosures for access frequencies. The first type is the SLC type. On the contrary, if the first data has a lower access frequency, the processing apparatus determines to store the data of the category in a storage unit (for example, the MLC storage unit, the TLC storage unit, or the QLC storage unit) having a lower programming rate. This can implement high-density and large-capacity data storage, and has small impact on running of an disclosure. The first type is the MLC storage unit, the TLC storage unit, or the QLC storage unit. When classification is performed by "access category", if the first data is hot data, that is, the access category of the first data is a hot data category, the processing apparatus determines to store the data of the category in a storage unit (for example, the SLC storage unit) having a higher programming rate. The first type is the SLC type. On the contrary, if the first data is cold data, that is, an access category of the first data is a cold data category, the processing apparatus determines to store the data of the category in a storage unit (for example, the MLC storage unit, the TLC storage unit, or the QLC storage unit) having a lower programming rate.

For another example, the at least two types of storage units include the SLC and the TLC. When classification is performed by "latency requirement", if the first data has a higher latency requirement, the processing apparatus determines to store the data of the category in a storage unit (for example, the SLC storage unit) having a higher programming rate. This can meet requirements of more threads or disclosures for latency requirements. The first type is the SLC type. On the contrary, if the first data has a lower latency requirement, the processing apparatus determines to store the data of the category in a storage unit (for example, the MLC storage unit, the TLC storage unit, or the QLC storage unit) having a lower programming rate. This can implement high-density and large-capacity data storage, and has small impact on running of an disclosure. The first type is the MLC storage unit, the TLC storage unit, or the QLC storage unit. When classification is performed by "latency category", if the first data is latency-sensitive, that is, the latency category of the first data is a latency-sensitive category, the processing apparatus determines to store the data of the category in a storage unit (for example, the SLC storage unit) having a higher programming rate. The first type is the SLC type. On the contrary, if the first data is latency-insensitive, that is, a latency category of the first data is a latency-insensitive category, the processing apparatus determines to store the data of the category in a storage unit (for example, the MLC storage unit, the TLC storage unit, or the QLC storage unit) having a lower programming rate. The first type is the MLC storage unit, the TLC storage unit, or the QLC storage unit. Alternatively, if the write request carrying the first data is sent by a foreground disclosure, that is, the latency category of the first data is the foreground thread latency category, the processing apparatus determines to store the data of the category in a storage unit (for example, the SLC storage unit) having a higher programming rate. The first type is the SLC type. On the contrary, if the write request carrying the first data is sent by a background disclosure, that is, the latency category of the first data is the foreground thread latency category, the processing apparatus determines to store the data of the category in a storage unit (for example, the MLC storage unit, the TLC storage unit, or the QLC storage unit) having a lower programming rate. The first type is the MLC storage unit, the TLC storage unit, or the QLC storage unit.

For example, the scenario shown in FIG. 5 is still used as an example. At the file system layer, if the file system is implemented as an F2FS file system, the F2FS file system selects a corresponding section based on a category of the write request at the current moment, to perform a subsequent processing step on the write request. For example, when the write request sent by the APP 1 is classified based on the "access frequency", the first data in the write request has a higher access frequency. When the write request sent by the APP 1 is classified based on the "latency requirement", the first data in the write request has a higher latency requirement. In this way, the F2FS file system places the write request sent by the APP 1 in an "SLC write mode section". When the write request sent by the APP n is classified based on the "access frequency", image data in the write request has a lower access frequency. When the write request sent by the APP n is classified based on the "latency requirement", image data in the write request has a lower latency requirement. In this way, the F2FS file system places the write request sent by the APP n in a "TLC write mode section".

Figure 6B:
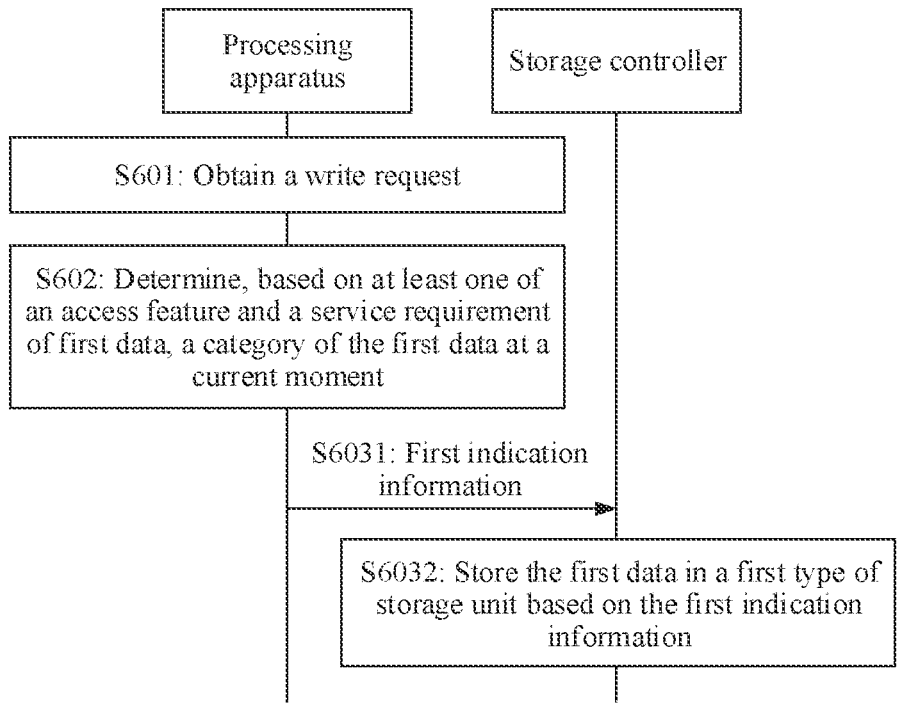
FIG. 6(b) is a schematic flowchart of another data storage method according to an embodiment of this disclosure.

Refer to FIG. 6(b). A specific implementation process of S603 may be, for example, but is not limited to, the following two steps.

S6031: The processing apparatus sends first indication information to the storage controller. Correspondingly, the storage controller receives the first indication information from the processing apparatus.

The first indication information indicates to store the first data in the first type of storage unit. The programming rate of the first type of storage unit meets a programming rate of the first data at the current moment, and is determined by the processing apparatus from the at least two types of storage units based on the category of the first data at the current moment.

The first indication information may be carried in the write request in S601. In a possible implementation, identification information of the first type is set in the write request. For example, if the first type is the SLC, an SLC write identifier is set in the write request. If the first type is TLC, a TLC write identifier is set in the write request. In this case, the processing apparatus also sends the write request to the storage controller. Correspondingly, the storage controller also receives the write request from the processing apparatus.

Alternatively, the first indication information and the write request in S601 may be messages independent of each other. In this case, the processing apparatus further sends the write request obtained in S601 to the storage controller. Correspondingly, the storage controller receives the write request from the processing apparatus.

For example, the scenario shown in FIG. 5 is still used as an example. The file system adds the SLC write identifier to the write request in the "SLC write mode section". The file system adds the TLC write identifier to the write request in the "TLC write mode section". The write request is transmitted from the file system layer to the device driver layer. At the device driver layer, the format of the write request is converted into a format that can be identified by the storage device layer.

S6032: The storage controller is stores the first data in the first type of storage unit based on the first indication information.

As described above, the storage controller and the storage array jointly implement a function of the device driver layer. At the device driver layer, if the first indication information indicates to store the first data in the SLC storage unit, for example, the first indication information is the SLC write identifier, the storage controller stores the first data in the SLC storage area. The scenario shown in FIG. 5 is used as an example. The storage controller writes data (namely the data after the variable i is re-assigned) in the write request of the APP 1 into the SLC storage area.

For another example, at the device driver layer, if the first indication information indicates to store the first data in the TLC storage unit, for example, the first indication information is the TLC write identifier, the storage controller stores the first data in the TLC storage area. The scenario shown in FIG. 5 is used as an example. The storage controller writes image data in the write request of the APP n into the TLC storage area.

It should be noted that a processing process from S601 to S603 mainly implements a function of "writing the first data in the write request to the storage apparatus". For a processing process of a read request, refer to the conventional technology. Details are not described herein again. When the file system layer is implemented as the F2FS file system, the F2FS file system performs migration by "section".

According to the data storage method provided in this embodiment of this disclosure, after obtaining the write request, the processing apparatus determines a category of the first data at the current moment, namely the category 1, where the first data is in the write request. Different categories may indicate different programming rate requirements of the first data. Then, the processing apparatus indicates the storage apparatus to store the first data in the first type of storage unit. The first type is determined based on the category 1 of the first data at the current moment. In other words, the programming rate of the first type of storage unit matches the programming rate requirement of the first data, to implement classified data storage. Not the first data in all write requests is stored in an SLC storage area. Instead, the first data in write requests is stored in different types of storage units based on categories. This effectively alleviates quick exhaustion of the SLC storage area, reduces a possibility of write rate reduction of the storage apparatus, and improves performance of the storage apparatus.

In some embodiments, after the storage apparatus writes first data in write requests of different categories into corresponding types of storage units, the processing apparatus in this embodiment of this disclosure can further perform the following two possible implementations.

Figure 7A:
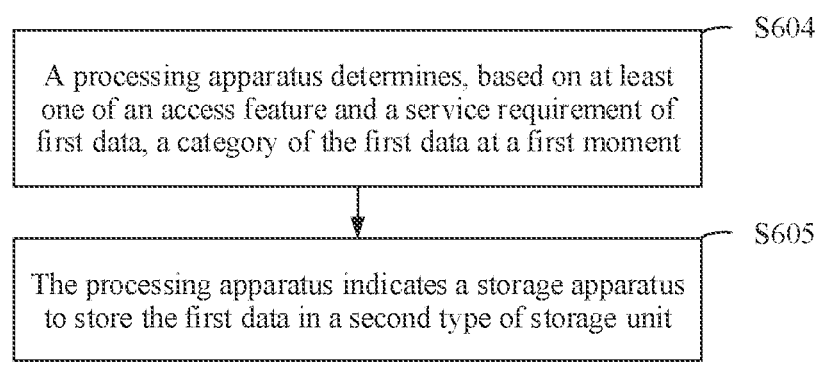
FIG. 7(a) is a schematic flowchart of still another data storage method according to an embodiment of this disclosure.

In a first possible implementation, when the processing apparatus is in an idle mode, the type of the storage unit of the first data is determined again based on the category of the first data. Refer to FIG. 7(a). A specific process of the data storage method according to this embodiment of this disclosure may be, for example, but is not limited to, the following example.

S604: The processing apparatus determines, based on at least one of an access feature and a service requirement of the first data, a category of the first data at a first moment.

The category of the first data at the first moment is denoted as a category 2. The category 2 indicates a programming rate requirement of the first data. The first moment is later than the "current moment" in S602.

For a specific implementation process of S604, refer to related descriptions of S602. The service requirement of the first data in S604 is a service requirement of the first data at the first moment. The access feature of the first data in S604 is an access feature of the first data at the first moment.

S605: The processing apparatus indicates the storage apparatus to store the first data in a second type of storage unit.

The second type is determined based on the second category. A programming rate of the second type of storage unit meets a programming rate requirement of the first data at the first moment, and is determined by the processing apparatus from at least two types of storage units based on the category of the first data at the first moment.

If the processing apparatus determines to store the first data in the first type of storage unit, which is the same as the type of storage unit used to store the first data in S603, the first data is still stored in the first type of storage unit, and "migration" is not performed. In other words, the type of the storage unit of the first data does not need to be updated, and S605 is not performed.

If the processing apparatus determines to store the first data in the second type of storage unit, which is different from the type of storage unit used to store the first data in S603, the type of the storage unit used to store the first data is updated. Because programming rates of the first type of storage unit and the second type of storage unit are different, there are the following two cases: Case 1: The programming rate of the first type of storage unit is higher than the programming rate of the second type of storage unit. In other words, the first type of storage unit may be the SLC storage unit, namely the "storage unit having a higher programming rate". The second type of storage unit may be the MLC storage unit, the TLC storage unit, or the QLC storage unit, namely the "storage unit having a lower programming rate". Case 2: The data programming rate of the first type of storage unit is lower than the data programming rate of the second type of storage unit. In other words, the first type of storage unit may be the MLC storage unit, the TLC storage unit, or the QLC storage unit, namely the "storage unit having a lower programming rate". The second type of storage unit may be the SLC storage unit, namely the "storage unit having a higher programming rate". When the type of the storage unit used to store the first data is updated, the processing apparatus performs S605.

Figure 7B:
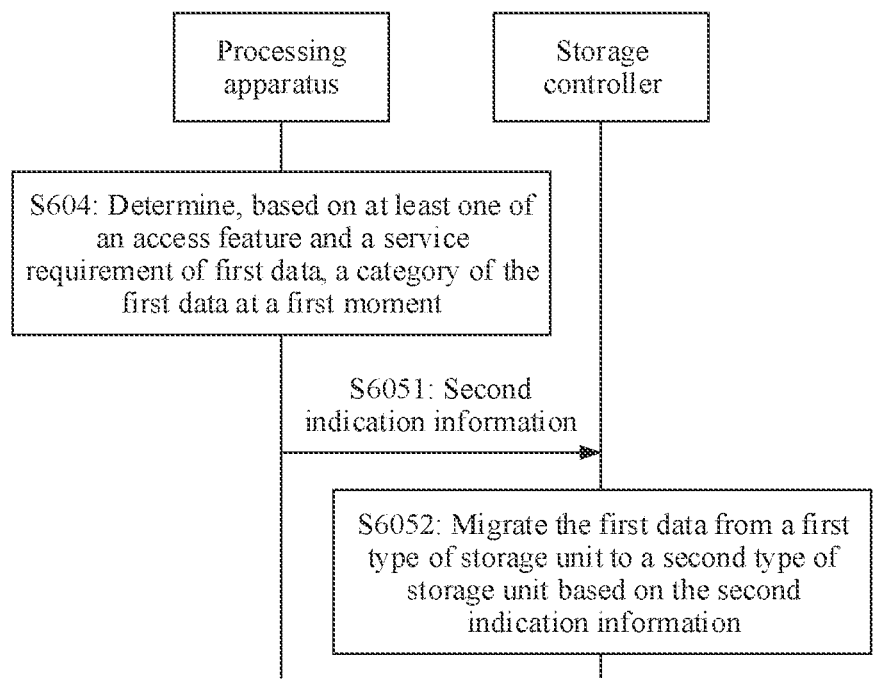
FIG. 7(b) is a schematic flowchart of yet another data storage method according to an embodiment of this disclosure.

Refer to FIG. 7(b). A specific implementation process of S605 may also include the following two steps.

S6051: The processing apparatus sends second indication information to the storage controller. Correspondingly, the storage controller receives the second indication information from the processing apparatus.

The second indication information indicates to store the first data in the second type of storage unit. For a specific implementation process of S6051, refer to related descriptions of S6031. Details are not described herein again.

S6052: The storage controller migrates the first data from the first type of storage unit to the second type of storage unit based on the second indication information.

For example, the storage array includes the SLC storage unit and the TLC storage unit. If the type of the storage unit indicated by the second indication information is the TLC storage unit, the storage controller stores the first data in the TLC storage unit, and deletes the first data in the SLC storage unit. If the type of the storage unit indicated by the second indication information is the SLC storage unit, the storage controller stores the first data in the SLC storage unit, and deletes the first data in the TLC storage unit.

In this case, after the storage controller has written the first data in the write request into the storage unit, the processing apparatus can further update the type of the storage unit of the first data based on the category of the first data, so that storage units having different programming rates store data having different access features or store data having different service requirements. For example, the "storage unit having a higher programming rate" always stores data having a higher access frequency or a higher latency requirement. A higher data programming rate of the storage unit indicates a higher data read rate of the storage unit. After a read request is obtained, data can be read from a storage unit of a corresponding type. This can avoid a low read rate caused by "reading data from the TLC storage area after all data in the SLC storage area is migrated to the TLC storage area" in a conventional technology. In addition, the data storage method in this embodiment of this disclosure can also enable the "storage unit having a lower programming rate" to always store data having a lower access frequency or a lower latency requirement. Because a lower programming rate of a storage unit indicates a higher storage density, high-density data storage is implemented.

Further, when "the data programming rate of the first type of storage unit is higher than the data programming rate of the second type of storage unit", in a possible implementation, specific implementation of S605 is as follows.

If a remaining storage capacity in the storage apparatus is less than a threshold 2, the processing apparatus indicates the storage apparatus to store the first data in the second type of storage unit.

The programming rate of the first type of storage unit is higher than a programming rate of the second type of storage unit.

The threshold 2 is a preset value, or may be a value set by a user according to an actual disclosure requirement.

For example, the storage unit includes the SLC storage unit and the TLC storage unit. The remaining storage capacity in the storage apparatus is determined based on an occupied storage capacity in the SLC storage area and an occupied storage capacity in a TLC storage area. The two types of storage units are the SLC storage area and the TLC storage area. The remaining storage capacity in the storage apparatus meets the following formula.

$$c = C - (C_1 \times 3 + C_1) \tag{I}$$

c indicates the remaining storage capacity in the storage apparatus, C indicates a storage capacity of the storage apparatus, $C_1$ indicates the occupied storage capacity in the SLC storage area, and $C_2$ indicates the occupied storage capacity in the TLC storage area.

A manner in which the processing apparatus obtains "the remaining storage capacity in the storage apparatus is less than the threshold 2" may be, for example, but is not limited to, the following two examples.

Example 1: If the processing apparatus knows the storage capacity C of the storage apparatus, when performing S603, or when performing S603 and S605, the processing apparatus can obtain the occupied storage capacity in the SLC storage area and the occupied storage capacity in the TLC storage area, and further obtain the remaining storage capacity in the storage apparatus according to the foregoing formula (1). The processing apparatus compares the remaining storage capacity in the storage apparatus with the threshold 2, to determine that "the remaining storage capacity in the storage apparatus is less than the threshold 2".

Example 2: The storage controller in the storage apparatus monitors occupied storage capacities in different types of storage units in real time, and further determines the remaining storage capacity in the storage apparatus according to the foregoing formula (1). When the remaining storage capacity in the storage apparatus is less than the threshold 2, the storage apparatus sends, to the processing apparatus, information indicating that "the remaining storage capacity in the storage apparatus is less than the threshold 2", so that the processing apparatus can learn that "the remaining storage capacity in the storage apparatus is less than the threshold 2".

It should be noted that, after the processing apparatus learns that "the remaining storage capacity in the storage apparatus is less than the threshold 2", if the processing apparatus still determines to store the first data in the first type of the storage unit, the processing apparatus repeatedly determines a type of storage unit used to store the first data until a quantity of repetition times of the processing apparatus meets a preset value.

In this case, when the remaining storage capacity in the storage apparatus is less than the threshold 2, the processing apparatus determines data to be migrated from the "storage unit having a higher programming rate" to the "storage unit having a lower programming rate". Because a lower programming rate of a storage unit indicates a higher storage density, high-density data storage is implemented, to improve the storage capacity of the storage apparatus.

In a second possible implementation, when the processing apparatus is in the idle mode, data in the "storage unit having a higher programming rate" is migrated to the "storage unit having a lower programming rate", and a storage location of the data in the "storage unit having a lower programming rate" remains unchanged. For a specific implementation process, refer to the conventional technology. Details are not described herein again.

In addition, it should be noted that, when different types of storage areas are dynamically configured, before performing S601, the processing apparatus dynamically configures sizes of different types of storage areas based on the remaining storage capacity in the storage apparatus. Alternatively, after performing S605, the processing apparatus dynamically configures sizes of different types of storage areas based on the remaining storage capacity in the storage apparatus. For example, if the storage apparatus includes the SLC storage area and the TLC storage area, for a specific processing process of the processing apparatus, refer to related descriptions in Manner 1. Details are not described herein again. Alternatively, different types of storage areas in the storage apparatus may be fixed. This is not limited in embodiments of this disclosure.

The solutions provided in embodiments of this disclosure are mainly described above from a perspective of interaction between apparatuses. Correspondingly, an embodiment of this disclosure further provides a communication device. The communication device may be the processing apparatus or the storage apparatus in the foregoing method embodiments, or may be a component used in the processing apparatus, or a component used in the storage apparatus. It may be understood that, to implement the foregoing functions, the communication device includes a hardware structure and/or a software module for performing a corresponding function. A person skilled in the art should easily be aware that, in combination with units and algorithm steps of the examples described in embodiments disclosed in this specification, this disclosure may be implemented by hardware or a combination of hardware and computer software. Whether a function is performed by hardware or hardware driven by computer software depends on particular disclosures and design constraints of the technical solutions. A person skilled in the art may use different methods to implement the described functions for each particular disclosure, but it should not be considered that the implementation goes beyond the scope of this disclosure.

Figure 8:
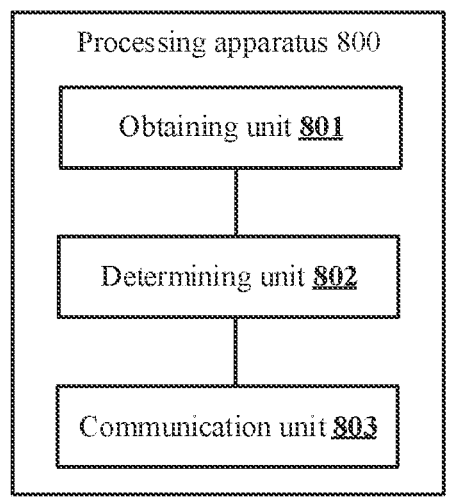
FIG. 8 is a schematic diagram of a structure of a processing apparatus according to an embodiment of this disclosure.

FIG. 8 is a schematic block diagram of a processing apparatus according to an embodiment of this disclosure. The processing apparatus 800 may exist in a form of software, a device, or a component (for example, a chip system) in a device. The processing apparatus 800 includes an obtaining unit 801, a determining unit 802, and a communication unit 803.

The communication unit 803 is an interface circuit of the processing apparatus 800, and is configured to receive a signal from another apparatus or send a signal to another apparatus. For example, when the processing apparatus 800 is implemented in a form of a chip, the communication unit 803 is an interface circuit of the chip for receiving a signal from another chip or apparatus, or an interface circuit of the chip for sending a signal to another chip or apparatus.

The communication unit 803 may include a communication unit configured to communicate with the storage apparatus and a communication unit configured to communicate with another device. These communication units may be integrated together, or may be implemented independently.

When the processing apparatus 800 is configured to implement a function of "classified data storage", for example, the obtaining unit 801 may be configured to support the processing apparatus 800 in performing S601 in FIG. 6(*a*), and/or another process used in the solution described in this specification. The determining unit 802 may be configured to support the processing apparatus 800 in performing S602 in FIG. 6(*a*). S604 in FIG. 7(*a*), and/or another process used in the solution described in this specification. The communication unit 803 is configured to support communication between the processing apparatus 800 and another device (for example, the storage apparatus). For example, the communication unit is configured to support the processing apparatus 800 in performing S603 shown in FIG. 6(*a*), S6031 shown in FIG. 6(*b*), S605 shown in FIG. 7(*a*), S6051 shown in FIG. 7(*b*), and/or another process used in the solution described in this specification.

Optionally, the processing apparatus 800 may further include a storage unit, configured to store program code and data of the processing apparatus 800. The data may include but is not limited to original data, intermediate data, or the like.

The obtaining unit 801 and the determining unit 802 may separately be a processor or a controller, for example, may be a CPU, a general-purpose processor, a DSP, an ASIC, an FPGA or another programming logical device, a transistor logical device, a hardware component, or any combination thereof, and may implement or execute various example logical blocks, modules, and circuits described with reference to content disclosed in this disclosure. Alternatively, the processor may be a combination of processors implementing a computing function, for example, a combination of one or more microprocessors, or a combination of the DSP and a microprocessor.

The storage unit may be a memory. The memory may be the storage apparatus, or may be a memory other than the storage apparatus.

Figure 9:
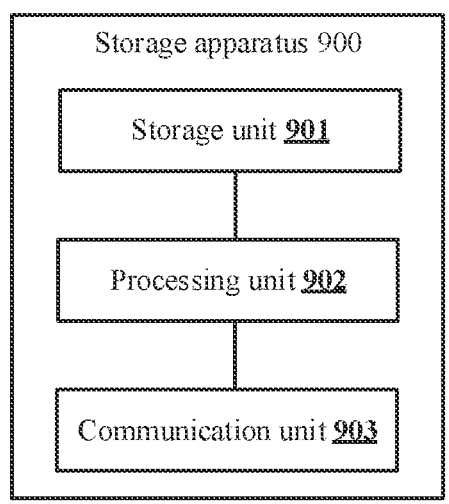
FIG. 9 is a schematic diagram of a structure of a storage apparatus according to an embodiment of this disclosure.

FIG. 9 is a schematic block diagram of a storage apparatus according to an embodiment of this disclosure. The storage apparatus 900 may be a device or a component (for example, a chip system) in a device. The storage apparatus 900 includes a storage unit 901, a processing unit 902, and a communication unit 903. There are at least two types of storage units 901. Different types of storage units have different write rates.

The communication unit 903 is an interface circuit of the storage apparatus 900, and is configured to receive a signal from another apparatus or send a signal to another apparatus. For example, when the storage apparatus 900 is implemented in a form of a chip, the communication unit 903 is an interface circuit of the chip for receiving a signal from another chip or apparatus, or an interface circuit of the chip for sending a signal to another chip or apparatus.

The communication unit 903 may include a communication unit configured to communicate with the processing apparatus and a communication unit configured to communicate with another device. These communication units may be integrated together, or may be implemented independently.

When the storage apparatus 900 is configured to implement the function of "classified data storage", for example, the processing unit 902 may be configured to support the storage apparatus 900 in performing S603 in FIG. 6(*a*), S6032 in FIG. 6(*b*), S605 in FIG. 7(*a*), and S6052 in FIG. 7(*b*), and/or another process used in the solution described in this specification.

When the obtaining unit 801 and the determining unit 802 in the processing apparatus 800 are implemented as primary processors, the processing unit 902 in the storage apparatus 900 is implemented as a storage controller, the storage unit 901 in the storage apparatus 900 is implemented as a storage array, and the communication unit 803 in the processing apparatus 800 and the communication unit 903 in the storage apparatus 900 are implemented as communication interfaces, the data storage system in this embodiment of this disclosure may be shown in FIG. 4.

A person of ordinary skill in the art may understand that all or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state drive (SSD)), or the like.

In the several embodiments provided in this disclosure, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units referred to as separate parts may or may not be physically separate, and parts displayed as units may or may not be physical units, may be located in one position, or may be distributed on a plurality of network device. Some or all of the units may be selected based on actual requirements to achieve the objectives of the solutions of embodiments.

In addition, function units in embodiments of this disclosure may be integrated into one processing unit, or each of the function units may exist alone physically, or two or more units are integrated into one unit. The integrated unit may be implemented as hardware, or may be implemented as a combination of hardware and a software functional unit.

Based on the foregoing descriptions of the implementations, a person skilled in the art may clearly understand that this disclosure may be implemented by software in addition to necessary universal hardware or by hardware only. In most circumstances, the former is a better implementation. Based on such an understanding, the technical solutions in this disclosure essentially or the part contributing to the conventional technologies may be implemented in a form of a software product. The computer software product is stored in a readable storage medium, such as a floppy disk, a hard disk or an optical disc of a computer, and includes several instructions for instructing a computer device (which may be a personal computer, a server, a network device, or the like) to perform the methods described in embodiments of this disclosure.

The foregoing descriptions are merely specific implementations of this disclosure, but are not intended to limit the protection scope of this disclosure. Any variation or replacement within the technical scope disclosed in this disclosure shall fall within the protection scope of this disclosure. Therefore, the protection scope of this disclosure shall be subject to the protection scope of the claims.

What is claimed is:

1. A data storage method, comprising:
    obtaining, by a processing apparatus of a data storage system, a write request generated by a disclosure layer of a Linux operating system;
    performing, by a device driver layer of a Linux operating system, format converting of the write request to be sent to a file system layer of the Linux operating system for writing first data into a storage apparatus, wherein the write request comprises the first data to be written, and wherein the file system layer provides a structured data storage and organization form of the first data, and the disclosure layer comprises a native disclosure or a third-party disclosure;
    determining, by the processing apparatus based on at least one of an access feature or a service requirement of the first data, a first category of the first data at a current moment, wherein the first category indicates a programming rate requirement of the first data, wherein the service requirement comprises at least one of a latency requirement or a latency category; and indicating, by the processing apparatus, the storage apparatus of the data storage system to store the first data in a first type of storage unit, wherein the first type is determined based on the first category, wherein the storage apparatus comprises at least two types of storage units having different data programming rates and a storage controller, wherein the at least two types of storage units comprise a Single Level Cell (SLC) and a Triple Level Cell (TLC), and the service requirement comprises the latency category, and wherein:

if the latency category is a latency-sensitive category, the first type of storage unit is the SLC; or if the latency category is a latency-insensitive category, the first type of storage unit is the TLC.

2. The data storage method of claim 1, wherein the indicating, by the processing apparatus, the storage apparatus to store the first data in a first type of storage unit comprises:

sending, by the processing apparatus, first indication information to the storage controller, wherein the first indication information indicates the storage controller to store the first data in the first type of storage unit.

3. The data storage method of claim 1, wherein a programming rate of the first type of storage unit satisfies the programming rate requirement indicated by the first category.

4. The data storage method of claim 1, wherein the access feature comprises at least one of an access frequency or an access category, and the access category is classified based on the access frequency.

5. The data storage method of claim 4, wherein the access feature comprises the access frequency, and a higher access frequency indicates a higher programming rate requirement of the first data indicated by the first category.

6. The data storage method of claim 4, wherein the at least two types of storage units comprise a single level cell (SLC) and a triple level cell (TLC), and the access feature comprises the access category; and wherein:

if the access category is a hot data category, the first type of storage unit is the SLC; or if the access category is a cold data category, the first type of storage unit is the TLC.

7. The data storage method of claim 1, wherein the service requirement comprises the latency requirement, and a higher latency requirement indicates a higher programming rate requirement of the first data indicated by the first category.

8. The data storage method of claim 1, wherein the at least two types of storage units comprise the SLC and the TLC, and the service requirement comprises the latency category; and wherein:

if the latency category is a foreground thread latency category, the first type of storage unit is the SLC; or if the latency category is a background thread latency category, the first type of storage unit is the TLC.

9. The data storage method of claim 1, wherein the method further comprises:

determining, by the processing apparatus based on at least one of the access feature or the service requirement of the first data, a second category of the first data at a first moment, wherein the second category indicates a programming rate requirement of the first data, and the first moment is later than the current moment; and indicating, by the processing apparatus, the storage apparatus to store the first data in a second type of storage unit, wherein the second type is determined based on the second category.

10. The data storage method of claim 9, wherein the indicating, by the processing apparatus, the storage apparatus to store the first data in a second type of storage unit comprises:

if a remaining storage capacity in the storage apparatus is less than a first threshold, indicating, by the processing apparatus, the storage apparatus to store the first data in the second type of storage unit, wherein a programming rate of the first type of storage unit is higher than a programming rate of the second type of storage unit.

11. A processor of a data storage system, wherein the data storage system comprises a storage apparatus having at least two types of storage units with different data programming rates and a storage controller, and wherein the data storage system stores programming instructions for execution by the processor to:

obtain, by a processing apparatus of a data storage system, a write request generated by a disclosure layer of a Linux operating system;

perform, by a device driver layer of a Linux operating system, format converting of the write request to be sent to a file system layer of the Linux operating system for writing first data into a storage apparatus, wherein the write request comprises the first data to be written, and wherein the file system layer provides a structured data storage and organization form of the first data, and the disclosure layer comprises a native disclosure or a third-party disclosure;

determine, based on at least one of an access feature or a service requirement of the first data, a first category of the first data at a current moment, wherein the first category indicates a programming rate requirement of the first data, wherein the service requirement comprises at least one of a latency requirement or a latency category; and indicate the storage apparatus to store the first data in a first type of storage unit, wherein the first type is determined based on the first category, wherein the at least two types of storage units comprise a Single Level Cell (SLC) and a Triple Level Cell (TLC), and the service requirement comprises the latency category, and wherein:

if the latency category is a latency-sensitive category, the first type of storage unit is the SLC; or if the latency category is a latency-insensitive category, the first type of storage unit is the TLC.

12. The processor of claim 11, wherein the programming instructions are for execution by the processor to:

send first indication information to the storage controller, wherein the first indication information indicates the storage controller to store the first data in the first type of storage unit.

13. The processor of claim 11, wherein a programming rate of the first type of storage unit satisfies the programming rate requirement indicated by the first category.

14. The processor of claim 11, wherein the access feature comprises at least one of an access frequency or an access category, and the access category is classified based on the access frequency.

15. A data storage system, comprising a processor, a storage controller, and a storage array, wherein the storage array comprises at least two types of storage units having different data programming rates, and wherein the data storage system stores programming instructions for execution by the processor to:

obtain, by a processing apparatus of a data storage system, a write request generated by a disclosure layer of a Linux operating system;

perform, by a device driver layer of a Linux operating system, format converting of the write request to be sent to a file system layer of the Linux operating system for writing first data into a storage apparatus, wherein the write request comprises the first data to be written, and wherein the file system layer provides a structured data storage and organization form of the first data, and the disclosure layer comprises a native disclosure or a third-party disclosure;

determine, based on at least one of an access feature or a service requirement of the first data, a first category of the first data at a current moment, wherein the first category indicates a programming rate requirement of the first data, wherein the service requirement comprises at least one of a latency requirement or a latency category; and indicate the storage controller to store the first data in a first type of storage unit, wherein the first type is determined based on the first category, wherein the at least two types of storage units comprise a Single Level Cell (SLC) and a Triple Level Cell (TLC), and the service requirement comprises the latency category, and wherein:

if the latency category is a latency-sensitive category, the first type of storage unit is the SLC; or if the latency category is a latency-insensitive category, the first type of storage unit is the TLC.

16. The data storage system of claim 15, wherein the access feature comprises at least one of an access frequency or an access category, and the access category is classified based on the access frequency.

17. The data storage system of claim 15, wherein the service requirement comprises at least one of a latency requirement or a latency category.

18. The data storage system of claim 15, wherein the programming instructions are for execution by the processor to:

determine, based on at least one of the access feature or the service requirement of the first data, a second category of the first data at a first moment, wherein the second category indicates a programming rate requirement of the first data, and the first moment is later than the current moment; and indicate the storage controller to store the first data in a second type of storage unit, wherein the second type is determined based on the second category.

* * * * *